UNITED STATES PATENT OFFICE.

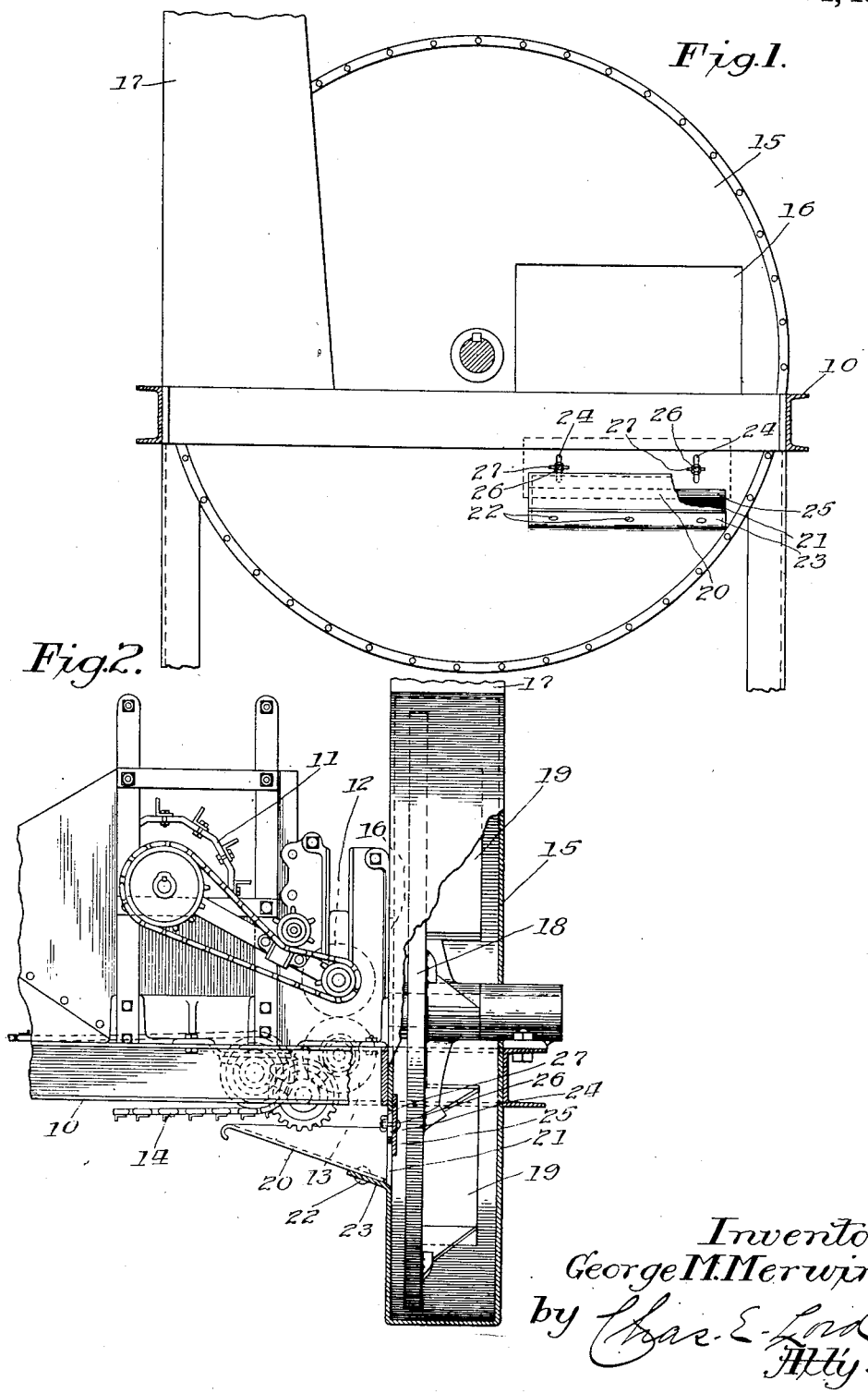

GEORGE M. MERWIN, OF BERWYN, ILLINOIS, ASSIGNOR, BY MESNE ASSIGNMENTS, TO INTERNATIONAL HARVESTER COMPANY, A CORPORATION OF NEW JERSEY.

ENSILAGE-CUTTER.

1,395,445.     Specification of Letters Patent.     Patented Nov. 1, 1921.

Application filed January 26, 1918. Serial No. 214,015.

*To all whom it may concern:*

Be it known that I, GEORGE M. MERWIN, a citizen of the United States, residing at Berwyn, in the county of Cook and State of Illinois, have invented certain new and useful Improvements in Ensilage-Cutters, of which the following is a full, clear, and exact specification.

This invention relates to ensilage cutters.

In the operation of the type of ensilage cutter employing a feed apron, or some other suitable feeding means, it has been found that certain of the material being fed to the cutter head has been carried around by the feeding means and deposited on the ground. This is true particularly of material that is dry or frozen and it has resulted in considerable loss of material and much litter about the machine.

The object of the present invention is to eliminate this waste and litter. This object is accomplished by providing means for directing into the fan casing or receiving receptacle, preferably through an adjustable opening, the material carried around by the feeding means, where it is acted upon by the elevating means and is conveyed to the silo or other storage receptacle.

In the drawings I have illustrated one embodiment of my invention, and

Figure 1 is a rear view of the fan casing showing my improved device in position thereon; and Fig. 2 is a side elevation of the front end of an ensilage cutter having my improved device thereon, a portion of the fan casing and of the coacting parts being shown in section.

The type of ensilage cutter illustrated is the same as that shown more in detail in Patent No. 1,246,976, November 20, 1917. The machine comprises a frame 10, of angle iron, upon the front portion of which is supported an upright frame carrying feeding mechanism for the ensilage cutter, this feeding mechanism comprising a paddle roll 11 and coöperating feeding rollers 12 and 13. The material to be cut is fed beneath the paddle roll on an endless apron 14, which carries it to a position adjacent the lower feed roll 13. These feeding members are driven through suitable gearing from a suitable source of power. The fan casing 15 is supported at the front end of the frame 10 and is provided with an opening 16 for the passage of the fodder into the casing, and at the opposite side has an upwardly extending portion 17 through which the cut material is forced. There is mounted in the fan casing a cutter head 18 of any well known type, the head illustrated being provided on its front face with fan blades 19 for creating a suction within the fan casing and forcing the material upwardly out of the casing to the silo or storage receptacle.

As stated above, in the type of ensilage cutter just described, it has been found that certain of the fodder or material being fed through the machine has been carried around by the conveyer or apron 14 to the lower run of said apron, from which position it drops to the ground, and unless gathered by hand, is lost. In addition to the material which is carried around by the apron, certain material has been dropped between the roller 13 and the fan casing. In order to overcome this defect I have secured to the fan casing below the feed apron and feed roller, an inclined chute 20, which leads to an opening 21 in the fan casing and directs this material which is carried around or dropped into the lower portion of the fan casing. This chute 20 is riveted as shown at 22 to an out-turned portion 23 of the fan casing. The casing 15 is slotted as shown at 24 just above the opening 21, and a plate 25 is adjustably secured to this slotted portion by a bolt 26 and thumb nuts 27 thereon. By means of this adjustable plate the size of the opening 21 can be regulated and in this way the degree of suction can also be regulated in such a manner as to provide sufficient suction to draw the material into the casing.

From the above description it will be seen that a simple and practical device is provided for directing the portion of the fodder otherwise wasted, into the fan casing of the machine, and thereby a great saving of fodder has been accomplished and much trash and litter about the machine has been eliminated.

While I have in the above specification described one embodiment which my invention may assume, it will be understood that the invention is capable of modifications which may be employed without departing from the scope and spirit of the invention as expressed by the following claim.

What I claim as new is:

In a feed cutter and conveyer, a fan and cutter casing provided with an upper opening in which material to be cut is fed, a feed mechanism to feed material to said upper opening, cutting and fan mechanism in said casing and said casing having a lower opening to receive material dropped from said feeding mechanism, a common pneumatic passage for said casing to discharge material received through both of said openings, and means for regulating the size of the lower opening to modify the suction effect of said fan discharge.

In testimony whereof I affix my signature.

GEORGE M. MERWIN.